Dec. 14, 1965

A. C. BROOKEY 3,223,133

NUTCRACKER

Filed Aug. 16, 1963

2 Sheets-Sheet 1

INVENTOR
Andrew C. Brookey

BY *Ehley & Ehley*

ATTORNEYS

Dec. 14, 1965
A. C. BROOKEY
3,223,133
NUTCRACKER
Filed Aug. 16, 1963
2 Sheets-Sheet 2
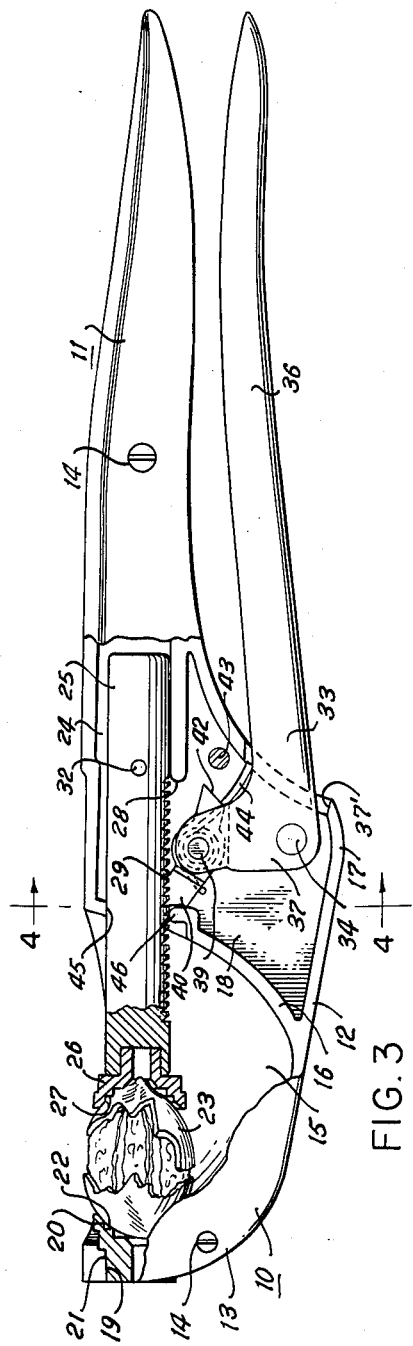
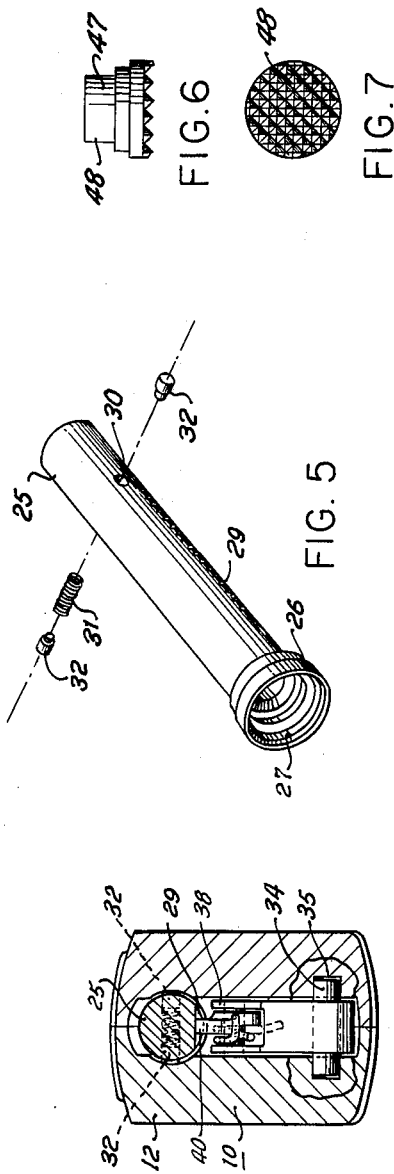
INVENTOR
Andrew C. Brookey
BY  *Shley & Shley*
ATTORNEYS United States Patent Office 3,223,133
Patented Dec. 14, 1965

3,223,133
NUTCRACKER
Andrew C. Brookey, Rte. 2, Box 368,
New Braunfels, Tex.
Filed Aug. 16, 1963, Ser. No. 302,496
1 Claim. (Cl. 146—16)

This invention relates to new and useful improvements in nutcrackers.

A principal object of the invention is to provide an improved nutcracker which is simple and rugged in structure, which is readily accommodated or adjusted to the cracking of nuts of various sizes and configurations, and in which the actual cracking operation is limited automatically in amplitude so as to minimize damage to the nut meats.

A further object of the invention is to provide an improved nutcracker having a fixed nutcracker jaw and a movable nutcracker jaw in which the movable jaw may readily be moved manually to confine a nut between the jaws and then advanced a short and limited distance under relatively great force to effect the cracking of the nut with minimum damage to the nut meats.

Yet another object of the invention is to provide an improved nutcracker of the character described having frictional means for holding the movable nutcracker jaw in a selected position.

Still another object of the invention is to provide an improved nutcracker in which the nutcracker jaws may readily be replaced with ice crushing jaws for the crushing of chunks or cubes of ice.

Other and more specific objects will be readily apparent from a reading of the following description.

A construction designed to carry out the invention will be hereinafter described, together with other features of the invention.

Figure 2:
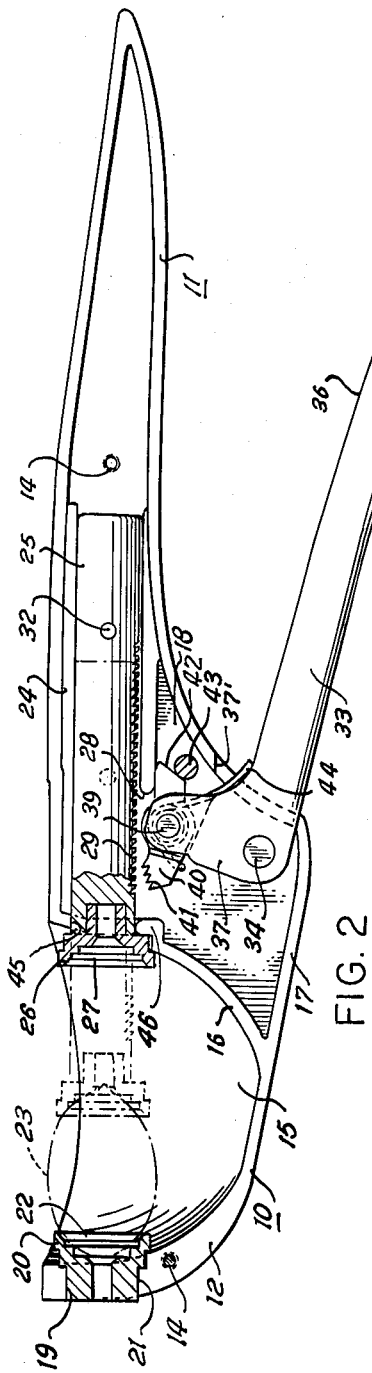
Figure 1:
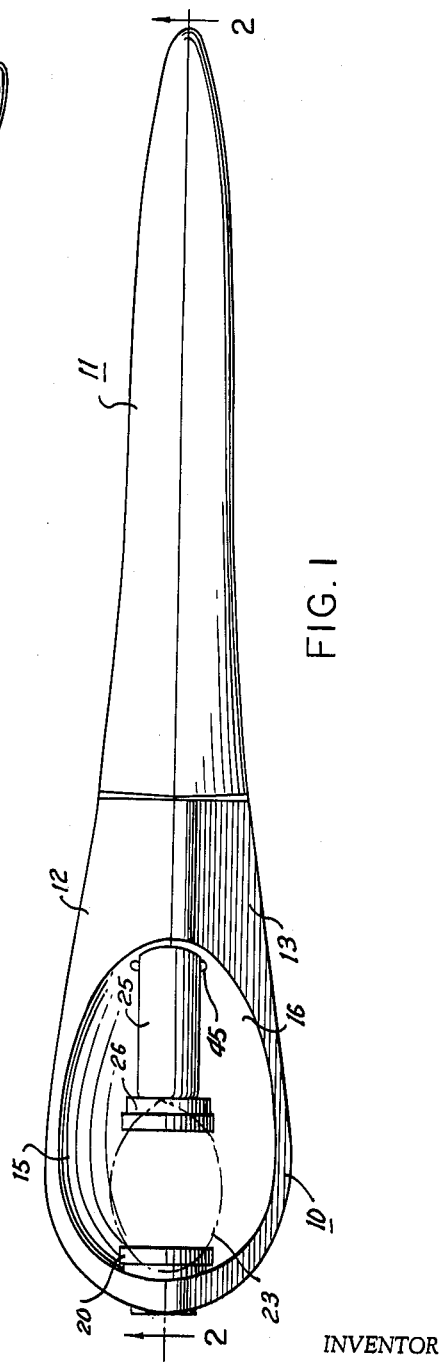

The invention will be more readily understood from a reading of the following specification and by reference to the accompanying drawings, wherein an example of the invention is shown, and wherein:

FIG. 1 is a plan view of a nutcracker constructed in accordance with this invention and showing the nutcracker engaging the nut prior to the cracking thereof, FIG. 2 is a longitudinal view, partly in elevation and partly in section taken upon the line 2—2 of FIG. 1, FIG. 3 is a view similar to FIG. 2 showing the position of the elements of the nutcracker after the shell of the nut has been cracked, FIG. 4 is a vertical, cross-sectional view taken upon the line 4—4 of FIG. 3, FIG. 5 is an exploded view in perspective showing the plunger and its movable jaw, together with the frictional holding means for the plunger, FIG. 6 is a side elevational view of an ice crushing or cracking jaw, and FIG. 7 is a bottom plan view showing the crushing face of the ice crushing jaw.

In the drawings, the numeral 10 designates generally a frame member having extending therefrom an elongate rigid handle, designated by the numeral 11, the frame member and handle desirably being formed integrally and comprising a pair of half sections 12 and 13 mating longitudinally of the frame member and handle and secured together by suitable bolts or screws 14. The frame member has a concave bowl or recess 15 within which the nutcracking operation is carried out, the rearward concave wall 16 of the bowl 15 enclosing with a bottom wall 17 of the frame member a housing 18 for certain of the working parts of the nutcracker.

The forward wall of the recess 15 opposite the handle 11 is provided with a countersunk opening 19 alined axially with the handle 11 and receiving a first or fixed nutcracker jaw 20 having a concentrically stepped outer periphery 21 for reception in the bore 19 and a concentrically stepped inner or axial bore 22 more or less conical in general configuration for reception of one end of the nut 23 indicated in dotted lines in FIGS. 1 and 2. The handle 11 is formed interiorly with tubular guide means 24 receiving an elongate cylindrical plunger 25, the latter projecting into the recess 15 and carrying therein a second or movable nutcracker jaw member 26 substantially identical to the jaw 20, and having a concentrically stepped, generally conical axial or interior bore 27 for receiving the opposite end of the nut 23. The tubular guide 24 is provided with a window or opening 28 in its underside adjoining the housing 18, and a multiplicity of ratchet teeth 29 are formed on the underside of the plunger 25 overlying the opening 28. A transverse bore 30 in the plunger 25 receives a coiled compression spring 31 and a pair of friction heads 32, formed of nylon or some other suitable friction material which engage the spring 31 and are constantly urged thereby outwardly against the side walls of the guide means 24 for frictionally engaging the latter and tending to hold the plunger 25 in any longitudinally adjusted position within the tubular guide 24. Thus, the movable head 26 may be manually grasped and moved across the recess 15 to engage the nut 23 in preliminary fashion, and the friction plugs 32 will tend to hold the plunger 25 and its jaw 26 in such position, as indicated in dotted lines in FIG. 2 and full lines in FIG. 1.

A bell crank lever 33 is formed with integral lateral trunnions 34 which are received in bearing recesses 35 provided in the side walls of the housing 18, as shown in FIG. 4, and has an elongate leg 36 projecting from the housing 18 through an opening 37' so as to be contiguous to and approximately parallel with the handle 11, and more or less coextensive therewith. The bell crank lever 33 also has a short leg 37 disposed within the housing 18 and projecting toward the plunger 25, the extremity of the leg 37 being bifurcated as indicated at 38 and carrying a transverse pin 39 on which a joggled ratchet member 40 is pivoted intermediate its ends. The end of the ratchet or ratchet member 40 projecting toward the wall 16 of the recess 15 carries ratchet teeth 41 projected toward and engageable with the ratchet teeth 29, and the opposite end of the ratchet or ratchet member 40 is formed with an angular cam face 42 inclined upwardly toward the plunger 25 and rearwardly toward the handle 11.

A stop pin 43 is positioned transversely of the housing 18 beneath the tubular guide member 24 and spaced slightly rearwardly of the opening 28, the pin 43 being adapted to engage the cam face 42 as the lever 36 is swung away from the handle 11 and the short leg 37 is swung toward the pin 43, thereby forcing the cam end of the ratchet 40 to swing upwardly into engagement with the underside of the guide member 24, as shown in FIG. 2, and the ratchet teeth 41 to swing downwardly out of engagement with the ratchet teeth 29. A suitable spring 44 encircling the pin 39, constantly urges the lever 36 to swing away from the handle 11 and the ratchet teeth 41 to swing toward the ratchet teeth 29.

The forward end of the plunger 25 adjacent the cracker head 26, projects into the recess 15 through an opening 45 in the upper portion of the wall 16 of the recess, and an offset stop or stop member 46 is formed within the housing 18 at the lower portion of the opening 49 for engagement by the ratchet end of the ratchet member 40. Thus, as illustrated in FIG. 3, forward movement of the ratchet 40 with the plunger 25 is limited by engagement of the ratchet or ratchet member with the stop member 46 and the amplitude of the stroke of the plunger 25 during the actual cracking operation is thus limited in a very positive fashion.

In the operation of the nutcracker, the lever 36 is allowed to swing away from the handle 11 under the impetus of the spring 44, bringing the cam end 42 of the ratchet 40 into position beneath the tubular guide 24 immediately rearwardly of the opening 28, continued rearward swinging of the short leg 37 thus forcing the cam face 42 against the pin or stop member 43 and swinging the ratchet teeth 41 downwardly away from the ratchet teeth 29. The nut 23 is now engaged in the fixed jaw 20 while the movable jaw 26 is drawn across the recess 15, along with the plunger 25 to engage the other end of the nut as shown in FIGS. 1 and 2. In this position, the friction members 32 tend to hold the plunger in the selected position in which the nut is being engaged by both ends and held in position, but no cracking force is being applied thereto. Now, as the lever 36 is swung toward the handle 11 by manual grasping and squeezing of the two together, the cam face 42 is withdrawn from the pin 43, permitting the ratchet teeth 41 to be swung upwardly by the spring 44 into engagement with the ratchet teeth 25, and continued movement of the lever 36 toward the handle 11 causes the short arm 37 to swing forwardly toward the recess 15, thus advancing the plunger 25 and jaw 26 to crack the nut, as shown in FIG. 3. Engagement of the forward end of the ratchet 40 with the stop member 46 functions to limit the forward travel of the plunger 25 and its cracking jaw 26 so that the application of excessive cracking force, and particularly an excessive movement of the jaw 26, is prevented so that the shell of the nut is effectively cracked without damage to the nut meats so that substantially whole nut meats may be obtained in most instances. In the alternative, the upper margin of the opening 37' many function as a stop. Of course, if the first movement is not sufficient to crack the nut, it may be repeated, and the latter is especially applicable to certain types of nuts, such as walnuts, filberts, almonds, and the like. The cracked shell fragments fall into the recess 15 for subsequent removal, and thus are conserved against random scattering, and at the same time, possible dropping and contamination of the nut meats is avoided. In most instances, it is desirable to operate the nutcracker with the recess 15 facing more or less upwardly, and it is also desirable to place one hand on the top of the recess to intercept any shell fragments tending to fly from the nutcracker under the cracking force applied.

After the nut has been cracked, the lever 36 may be allowed to return to its position shown in FIG. 2 under the impetus of the spring 44, thus automatically retracting the ratchet teeth 41 and permitting longitudinal manual shifting of the plunger 25 and movable jaw 26, as may be desired for reception of successive nuts for cracking purposes.

A modification of the cracking jaws 20 and 26 is shown in FIGS. 6 and 7, and includes an ice cracking jaw 47 having a concentrically stepped outer periphery 48 for reception in the opening 29 and in the end portion of the plunger 25, the ice cracking or crushing jaws having diamond-point or serrated faces 49 for the quick and ready crushing of ice cubes, chunks of ice, and the like.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

A nutcracker including a frame member, an elongate rigid handle extending from the frame member, the frame member having a concave cup-like recess of such dimensions as to receive almost totally a nut such as a pecan, a first nutcracker jaw carried by the frame member in the recess and facing the handle, an elongate plunger telescoping the handle, a second nutcracker jaw carried on the plunger and disposed in the recess facing the first nutcracker jaw, a multiplicity of small closely-spaced ratchet teeth on the plunger, a bell crank lever pivotally mounted in the frame member having a long handle-forming leg extending from the frame member contiguous the handle and a short leg in the frame member extending toward the ratchet teeth on the plunger, a ratchet pivotally mounted on the short leg and having a plurality of ratchet teeth, spring means constantly urging the ratchet teeth of the ratchet toward the ratchet teeth of the plunger, the long leg of the bell crank lever being swingable away from and toward the handle, cam means on the ratchet, and stop means in the frame member for engaging the ratchet cam means and swinging the ratchet teeth of the ratchet away from the ratchet teeth of the plunger when the long leg of the bell crank lever is swung away from the handle, the ratchet being pivotally mounted intermediate its ends on the short leg of the bell crank lever, one end of the ratchet carrying the ratchet teeth and the other end of the ratchet carrying the cam means, the cam means being an angularly-inclined face on said other end of the ratchet, and the stop means being a pin extending transversely interiorly of the frame member.

References Cited by the Examiner
UNITED STATES PATENTS

| | | | |
|---|---|---|---|
| 1,555,518 | 9/1925 | Ramey | 146—16 |
| 2,267,499 | 12/1941 | Freidag | 146—16 |
| 2,526,273 | 10/1950 | Rimes | 146—16 |
| 2,799,310 | 7/1957 | Jacobs | 146—14 |

ROBERT C. RIORDON, *Primary Examiner.*

J. SPENCER OVERHOLSER, *Examiner.*